United States Patent [19]

Geeves

[11] 4,431,208
[45] Feb. 14, 1984

[54] TRAILER WALKER
[75] Inventor: Jack Geeves, Weyburn, Canada
[73] Assignee: Allan G. Messer, Weyburn, Canada
[21] Appl. No.: 397,578
[22] Filed: Jul. 12, 1982
[51] Int. Cl.³ .............................................. B60D 1/00
[52] U.S. Cl. ................................... 280/475; 180/8 C;
   280/477; 280/3; 254/420
[58] Field of Search .................... 280/218, 219, 763.1,
   280/28.5, 151, 475, 477, 425 R, 478 R, 478 A,
   478 B, 491 R, 491 A–491 F, 3; 180/8 C, 8 R;
   254/420 X; 305/1, 3

[56] References Cited
U.S. PATENT DOCUMENTS
2,638,315  5/1953  Wagner ............................... 254/420
3,740,077  6/1973  Williams ............................. 180/8.5
3,807,767  4/1974  Moline .................................. 280/3

*Primary Examiner*—Joseph F. Peters, Jr.
*Assistant Examiner*—Joseph McCarthy
*Attorney, Agent, or Firm*—Stanley G. Ade

[57] ABSTRACT

Recreation and work-type trailers are difficult to maneuver once detached from the towing vehicle even with the conventional dolley wheel in place. This device includes a horizontal main bar with a pair of plates one at each end being mounted to the underside of the main bar by a bolt and spring loaded to give a limited flexibility thereto. A central socket is pivoted to the upper side of the main bar and receives the stem of the trailer hitch. A handle socket is secured adjacent each end of the main bar also on the upper surface thereof and incline upwardly and outwardly therefrom and selectively receive an elongated handle so that the respective end of the main bar can be elevated by the handle and "walked" forwardly or backwardly or sideways as desired thus maneuvering the trailer readily and easily.

19 Claims, 4 Drawing Figures

TRAILER WALKER

BACKGROUND OF THE INVENTION

This invention relates to new and useful devices in trailer walkers or devices to assist in maneuvering house or work-type trailers when detached from the towing unit.

Such trailers are conventionally provided with a stem adjacent the hitch which can be raised and lowered by means of a rotatable handle and, when parked, this stem usually rests upon a block and is adjusted so that the trailer is substantially level fore and aft. However a dolley wheel is supplied which is detachably securable to the base of the stem and supposedly assists in the maneuvering of the trailer. While this is relatively easy on a firm surface and if the trailer is relatively light, nevertheless it is impossible to use on gravel, soft ground or the like or even on a solid surface if the trailer is relatively heavy.

The present device overcomes these disadvantages by providing a device which is detachably securable to the lower end of the stem and facilitates the maneuvering of the trailer, within minutes, so that it can be positioned as desired.

SUMMARY OF THE INVENTION

In accordance with the invention there is provided a trailer walking device for use with the cylindrical stem of a trailer hitch assembly; comprising in combination a main beam, a foot pad secured adjacent each end thereof and upon the underside of said main beam, a stem receiving socket mounted upon the upper side of said main beam and substantially centrally between the ends thereof, a detachable manipulating handle; and a manipulating handle socket adjacent each end of said main beam selectively engageable by said handle.

Another advantage of the invention is that it is usable on a variety of supporting surfaces whether the surface being concrete, gravel, firm ground or the like.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
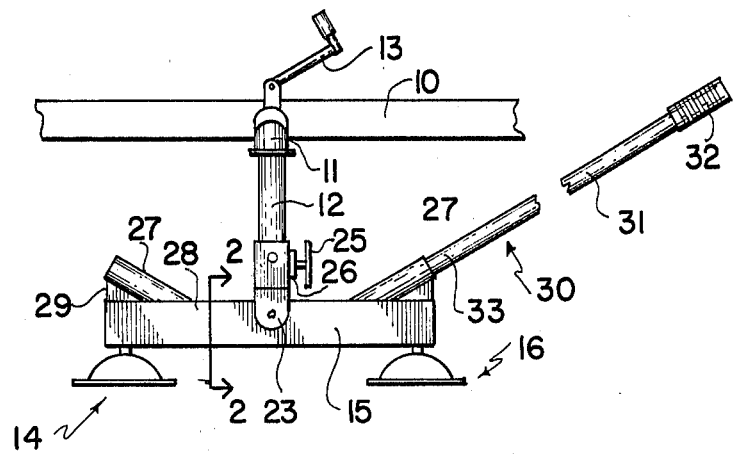
FIG. 1 is a front elevation of the device secured to the lower end of the stem with the front hitch portion of the trailer being shown in fragmentary form.
Figure 2:
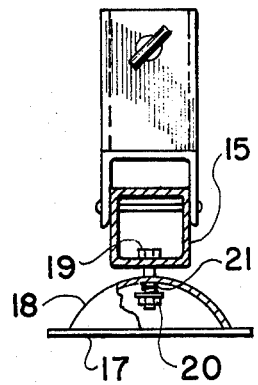
FIG. 2 is a section of substantially along the line 2—2 of FIG. 1.
Figure 3:
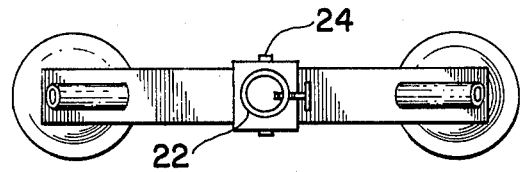
FIG. 3 is a plan view of FIG. 2.

Proceeding therefore to describe the invention in detail, reference character 10 illustrates, a front elevation, of the front frame hitch members of a trailer with the hitch 11 being secured at the apex thereof. A vertically situated stem 12 is screw threadably engageable through a nut assembly (not illustrated) mounted behind the hitch 11 and is rotatable by means of a handle 13 so that the stem can be raised and lowered relative to the frame members 10.

The invention collectively designated 14 consists of a main beam 15 which may be of a rectangular or circular cross section. A foot pad assembly 16 is provided adjacent each end of the main beam and preferably takes the form of a circular pad 17 with a hemispherical portion 18 secured to the upper surface thereof, said portion 18 being hollow. A bolt 19 extends through an aperture within the base of the main beam 15 and through an aperture formed through the hemispherical portion 18 and at the upper side thereof substantially on the vertical axis of the foot pad assembly 16. A nut and washer 20 screw threadably engages the lower end of the bolt and a small compression spring 21 surrounds the bolt and reacts between the washer and the inner surface of the domed or hemispherical portion 18 thus mounting the foot pad to the main beam with the spring providing clearance and slight flexibility or pivotal mounting of the foot pad assembly to the main beam.

A stem receiving socket 22 is provided and is mounted upon a pair of spaced and parallel ears or lugs 23 one upon each side thereof. These lugs are in turn pivotally mounted one to each side of the main beam 15 by means of a pivot pin 24 and the stem receiving socket is mounted centrally of the main beam intermediate the ends thereof and extending upwardly therefrom. This stem receiving socket is pivotal towards either end of the main beam because of the transverse location of the pivot pin or pins 24.

The socket receives the lower end of the stem 12 and is detachably secured thereto by means of a wing nut 25 engaging through a screw threaded nut 26 on the side of the socket and extending through the wall of the socket to engage against the side of the stem 12.

A cylindrical manipulating handle socket 27 is secured upon the upper surface 28 of the main beam and inclines upwardly and outwardly from the upper surface with one such socket being provided adjacent each end of the main beam as clearly illustrated in FIG. 1. A flange 29 is welded to the socket 27 and to the upper surface of the main beam to position and brace the sockets at the desired angle.

A detachable handle 30 includes the elongated main portion 31 and a hand grip 32 on the upper end thereof. The distal or other end 33 of the handle detachably engages within either of the sockets 27 and extends upwardly and outwardly as shown also in FIG. 1.

Figure 4:
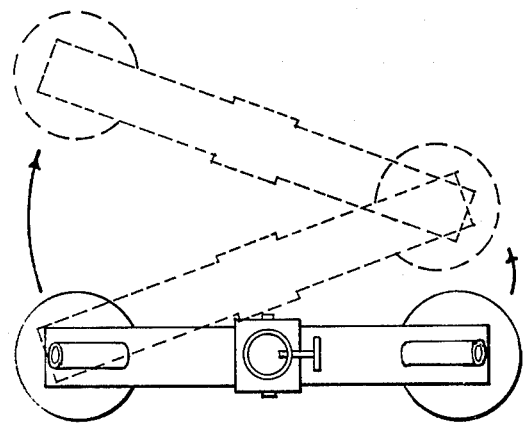
FIG. 4 is schematic plan view showing the action of the device.

In operation, the device is detachably secured to the underside of the stem 12 whereupon the handle 30 is engaged in one or the other of the sockets 27. By lifting and swinging that particular end of the main beam, the trailer may be walked as shown schematically in FIG. 4 and located in the desired position. By alternating the handle in one or the other of the sockets 27, alternate movements may be accomplished.

Once positioned, the walker may be left in place but preferably it is removed and a block engaged under the lower end of the stem in a conventional manner.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A trailer walking device for use with the cylindrical stem of a trailer hitch assembly; comprising in combination a main beam, a foot pad secured adjacent each end thereof and upon the underside of said main beam, a stem receiving socket mounted upon the upper side of said main beam and substantially centrally between the ends thereof, a detachable manipulating handle; and a manipulating handle socket adjacent each end of said main beam selectively engageable by said handle.

2. The device according to claim 1 in which said manipulating handle sockets are on the upper side of said main beam.

3. The device according to claim 1 in which said manipulating handle sockets incline upwardly and outwardly from said main beam.

4. The device according to claim 2 in which said manipulating handle sockets incline upwardly and outwardly from said main beam.

5. The device according to claim 1 which includes means mounting said foot pads to said main beam, said means including a mounting pin secured to and extending downwardly from said main beam and spring loaded means securing said foot pad to said mounting pin for limited pivotal movement thereof relative to said main beam.

6. The device according to claim 2 which includes means mounting said foot pads to said main beam, said means including a mounting pin secured to and extending downwardly from said main beam and spring loaded means securing said foot pad to said mounting pin for limited pivotal movement thereof relative to said main beam.

7. The device according to claim 3 which includes means mounting said foot pads to said main beam, said means including a mounting pin secured to and extending downwardly from said main beam and spring loaded means securing said foot pad to said mounting pin for limited pivotal movement thereof relative to said main beam.

8. The device according to claim 4 which includes means mounting said foot pads to said main beam, said means including a mounting pin secured to and extending downwardly from said main beam and spring loaded means securing said foot pad to said mounting pin for limited pivotal movement thereof relative to said main beam.

9. The device according to claim 1 in which said stem receiving socket is pivotally mounted to said main beam for limited pivotal movement towards each end of said main beam.

10. The device according to claim 2 in which said stem receiving socket is pivotally mounted to said main beam for limited pivotal movement towards each end of said main beam.

11. The device according to claim 3 in which said stem receiving socket is pivotally mounted to said main beam for limited pivotal movement towards each end of said main beam.

12. The device according to claim 4 in which said stem receiving socket is pivotally mounted to said main beam for limited pivotal movement towards each end of said main beam.

13. The device according to claim 5 in which said stem receiving socket is pivotally mounted to said main beam for limited pivotal movement towards each end of said main beam.

14. The device according to claim 6 in which said stem receiving socket is pivotally mounted to said main beam for limited pivotal movement towards each end of said main beam.

15. The device according to claim 7 in which said stem receiving socket is pivotally mounted to said main beam for limited pivotal movement towards each end of said main beam.

16. The device according to claim 8 in which said stem receiving socket is pivotally mounted to said main beam for limited pivotal movement towards each end of said main beam.

17. The device according to claims 9, 10 or 11 which includes set screw means operatively connected to said stem receiving socket and extending through the wall thereof to detachably clamp the associated stem into said stem receiving socket.

18. The device according to claims 12, 13 or 14 which includes set screw means operatively connected to said stem receiving socket and extending through the wall thereof to detachably clamp the associated stem into said stem receiving socket.

19. The device according to claims 15 or 16 which includes set screw means operatively connected to said stem receiving socket and extending through the wall thereof to detachably clamp the associated stem into said stem receiving socket.

* * * * *